United States Patent
Hoelling et al.

(10) Patent No.: US 9,315,272 B2
(45) Date of Patent: Apr. 19, 2016

(54) SYSTEM AND METHOD FOR COOLING AND/OR HEATING AIRCRAFT DEVICES

(75) Inventors: Marc Hoelling, Hamburg (DE); Werner Rothammer, Buchholz (DE); Jan Dittmar, Buxtehude (DE); Carsten Colberg, Hamburg (DE); Wilson Willy Casas Noriega, Hamburg (DE); Ozan Uluc, Hamburg (DE); Sebastian Roering, Hamburg (DE); Holger Wolf, Lauenbrueck (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 895 days.

(21) Appl. No.: 13/432,733

(22) Filed: Mar. 28, 2012

(65) Prior Publication Data

US 2013/0075055 A1    Mar. 28, 2013

Related U.S. Application Data

(63) Continuation of application No. PCT/EP2010/005913, filed on Sep. 28, 2010.

(60) Provisional application No. 61/261,025, filed on Nov. 13, 2009, provisional application No. 61/246,662, filed on Sep. 29, 2009.

(30) Foreign Application Priority Data

Sep. 29, 2009  (DE) .......................... 10 2009 043 429
Nov. 13, 2009  (DE) .......................... 10 2009 053 094

(51) Int. Cl.
*B64D 13/08* (2006.01)
*B64D 13/00* (2006.01)
*B64D 13/06* (2006.01)

(52) U.S. Cl.
CPC ............... *B64D 13/08* (2013.01); *B64D 13/00* (2013.01); *B64D 2013/0655* (2013.01); *Y02T 50/44* (2013.01); *Y02T 50/56* (2013.01)

(58) Field of Classification Search
CPC .................. B64D 13/08; B64D 13/00; B64D 2013/0655; Y02T 50/44; Y02T 50/56
See application file for complete search history.

(56) References Cited

U.S. PATENT DOCUMENTS

| | | | | |
|---|---|---|---|---|
| 6,401,473 | B1 * | 6/2002 | Ng .......................... | B64D 13/06 454/71 |
| 6,666,039 | B2 * | 12/2003 | Mitani ................... | B64D 13/06 62/172 |

(Continued)

FOREIGN PATENT DOCUMENTS

| DE | 103 61 645 A1 | 8/2005 |
|---|---|---|
| DE | 103 61 709 A1 | 8/2005 |

(Continued)

OTHER PUBLICATIONS

Decision to Grant issued Jul. 5, 2013 in corresponding Russian application No. 2012115534.

*Primary Examiner* — Ramesh Patel
(74) *Attorney, Agent, or Firm* — Carter, DeLuca, Farrell & Schmidt, LLP

(57) ABSTRACT

A system for cooling and/or heating aircraft devices to be cooled and/or heated includes a first individual cooling and/or heating system associated with a first aircraft device to be cooled and/or heated, a second individual cooling and/or heating system associated with a second aircraft device to be cooled and/or heated, a cooling and/or heating energy supply apparatus adapted to supply cooling and/or heating energy generated by the first and/or the second individual cooling and/or heating system to the first and/or the second aircraft device to be cooled and/or heated, a control device adapted to receive and process signals characteristic of the cooling and/or heating requirements of the first and/or the second aircraft device to be cooled and/or heated and of the load condition of the first and/or the second individual cooling and/or heating system.

14 Claims, 1 Drawing Sheet

(56) References Cited

U.S. PATENT DOCUMENTS

| | | | | |
|---|---|---|---|---|
| 7,802,732 B2* | 9/2010 | Scherer | ............... | B64D 13/00 165/205 |
| 7,878,887 B2* | 2/2011 | Elmers | ............... | B64D 13/00 454/71 |
| 8,336,609 B2* | 12/2012 | Schwan | ............... | B64D 13/00 165/202 |
| 8,435,103 B2* | 5/2013 | Centofante | ............ | B64D 13/06 454/71 |
| 9,090,350 B2* | 7/2015 | Kelnhofer | ............ | B64D 13/00 |
| 2005/0051668 A1* | 3/2005 | Atkey | ............... | B64D 13/06 244/118.5 |
| 2005/0061012 A1* | 3/2005 | Zywiak | ............... | B64D 11/04 62/244 |
| 2007/0137234 A1* | 6/2007 | Zywiak | ............... | B64D 13/06 62/239 |
| 2008/0134703 A1* | 6/2008 | Scherer | ............... | B64D 11/04 62/244 |
| 2008/0283663 A1* | 11/2008 | Space | ............... | B64D 13/06 244/118.5 |
| 2009/0000328 A1* | 1/2009 | Scherer | ............... | B64D 13/00 62/335 |
| 2009/0030555 A1 | 1/2009 | Gray | | |
| 2009/0126900 A1* | 5/2009 | Scherer | ............... | B64D 11/04 165/41 |

FOREIGN PATENT DOCUMENTS

| | | |
|---|---|---|
| DE | 10 2005 061 599 A1 | 6/2007 |
| EP | 1 801 009 A2 | 6/2007 |
| EP | 1 808 373 A2 | 7/2007 |
| WO | 2005/063567 A1 | 7/2005 |
| WO | 2007087974 A1 | 8/2007 |
| WO | 2009/090026 A1 | 7/2009 |

* cited by examiner

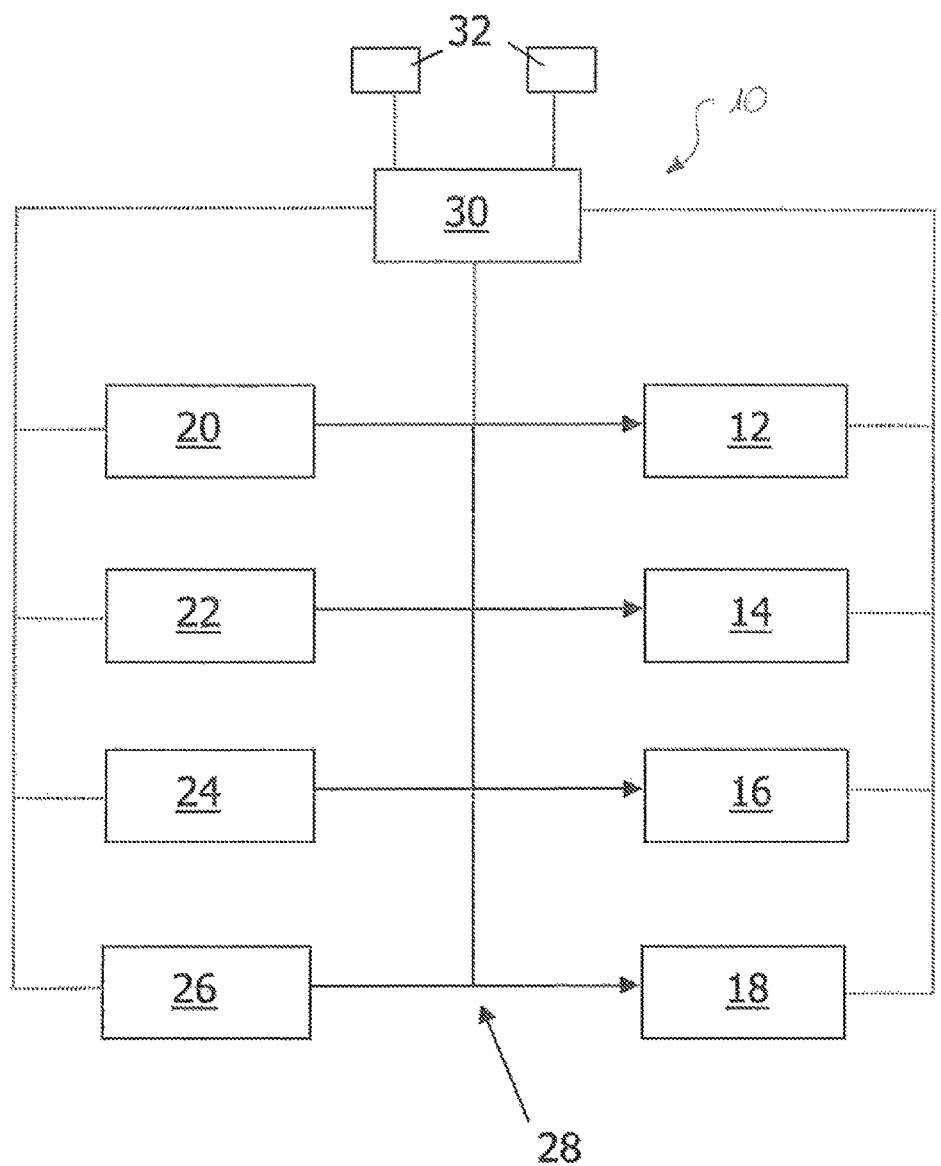

SYSTEM AND METHOD FOR COOLING AND/OR HEATING AIRCRAFT DEVICES

CROSS-REFERENCE TO RELATED APPLICATIONS

This application is a continuation of International Application No. PCT/EP2010/005913, filed Sep. 28, 2010, which claims the benefit of and priority to German Patent Application No. 10 2009 043 429.1 and U.S. Patent Application No. 61/246,662 filed Sep. 29, 2009, and German Patent Application No. 10 2009 053 094.0 and U.S. Patent Application No. 61/261,025 filed Nov. 13, 2009, the entire contents of which are incorporated by reference herein.

TECHNICAL FIELD

The invention relates to a system and a method for cooling and/or heating aircraft devices to be cooled and/or heated.

BACKGROUND OF RELATED ART

Modern aircraft, in particular commercial aircraft, comprise a large number of components and systems which have to be cooled and/or heated in dependence on their configuration, their function and their operating state, and also in dependence on the ambient conditions. Some systems present on board the aircraft, such as, for example, electronic devices, have to be exclusively cooled during operation in order to ensure sufficient removal of the heat loads generated by the aircraft devices and thus proper functioning of the aircraft devices. Other systems, by contrast, have to be heated, particularly when the aircraft is flying and outside temperatures of up to −60° C. prevail. Finally, there are systems which have to be cooled in certain operating situations, for example when the aircraft is on the ground, and heated in other operating situations, for example when the aircraft is flying.

In aircraft used at present, the various devices present on board the aircraft which are to be cooled and/or heated are supplied with cooling and/or heating energy by individual cooling and/or heating systems associated with the aircraft devices to be cooled and/or heated. The individual cooling and/or heating systems are generally adapted, with regard to their setup and their operation, specifically to the cooling and/or heating requirements of the aircraft devices to be cooled and/or heated. In order to be able to ensure reliably in all operating situations of the aircraft proper functioning of the aircraft devices to be cooled and/or heated, the individual cooling and/or heating systems associated with the aircraft devices to be cooled and/or heated must therefore be dimensioned and designed such that they enable a sufficient supply of cooling and/or heating energy to the aircraft devices to be cooled and/or heated also at peak-load periods, i.e. periods of maximum cooling and/or heating requirements of the aircraft devices to be cooled and/or heated. The individual cooling and/or heating systems therefore have a relatively high weight and a relatively high installation space requirement. Moreover, the operation of the individual cooling and/or heating systems is very energy-intensive, particularly at peak-load periods.

SUMMARY

The object on which the invention is based is to provide a system and a method for cooling and/or heating aircraft devices to be cooled and/or heated which enable lightweight and installation space-saving dimensioning and design of individual cooling and/or heating systems associated with the aircraft devices to be cooled and/or heated, and energy-efficient operation of these individual cooling and/or heating systems.

This object is achieved by a system for cooling and/or heating aircraft devices to be cooled and/or heated having the features of Claim 1 and a method for cooling and/or heating aircraft devices to be cooled and/or heated having the features of Claim 8.

The system according to the invention for cooling and/or heating aircraft devices to be cooled and/or heated comprises a first individual cooling and/or heating system associated with a first aircraft device to be cooled and/or heated. The system according to the invention further comprises a second individual cooling and/or heating system associated with a second aircraft device to be cooled and/or heated. The aircraft devices to be cooled and/or heated can be any components or systems on board the aircraft, such as, for example, electrical or electronic devices, but also parts of a passenger cabin or a cargo compartment of the aircraft. The individual cooling and/or heating systems serve to supply the aircraft devices with cooling and/or heating energy, according to requirements. The individual cooling and/or heating systems here can be designed such that they are able to generate merely cooling or heating energy. Alternatively to this, however, the individual cooling and/or heating systems can also be designed such that they can supply the aircraft devices with cooling or heating energy, for example, in dependence on the operating situation of the aircraft.

The system according to the invention for cooling and/or heating aircraft devices to be cooled and/or heated further comprises a cooling and/or heating energy supply apparatus which is adapted to supply cooling and/or heating energy generated by the first and/or the second individual cooling and/or heating system to the first and/or the second aircraft device to be cooled and/or heated. In other words, the cooling and/or heating energy supply apparatus serves to distribute cooling and/or heating energy generated by the first and/or the second individual cooling and/or heating system to the first and/or the second aircraft device to be cooled and/or heated.

For this purpose, the cooling and/or heating energy supply apparatus can comprise, for example, an appropriately configured conduit system which is able to supply cooling and/or heating energy generated by the first individual cooling and/or heating system either only to the first or only to the second, but if required also to the first and to the second aircraft device to be cooled and/or heated. Similarly, the conduit system of the cooling and/or heating energy supply apparatus can enable the supply of cooling and/or heating energy generated by the second individual cooling and/or heating system merely to the first or merely to the second, but also to the first and to the second aircraft device to be cooled and/or heated. The cooling and/or heating energy streams through the conduit system of the cooling and/or heating energy supply apparatus can be controlled, for example, by appropriate valves arranged in the conduits of the conduit system.

Finally, the system according to the invention comprises a control device which is adapted to receive and process signals characteristic of the cooling and/or heating requirements of the first aircraft device to be cooled and/or heated, the cooling and/or heating requirements of the second aircraft device to be cooled and/or heated and of the load condition of the first and/or the second individual cooling and/or heating system. The signals to be supplied to the control device can be provided, for example, by appropriate sensors associated with the first and the second aircraft device and the first and the second individual cooling and/or heating system, respectively. The sensors associated with the first and the second aircraft device can be embodied as temperature sensors, but also as sensors which detect power parameters of the first and the second aircraft device which are characteristic of the operating state of the first and the second aircraft device. Similarly, the sensors associated with the first and the second individual cooling and/or heating system can be embodied as sensors which detect power parameters of the first and the second individual cooling and/or heating system which are characteristic of the operating state of the first and the second individual cooling and/or heating system. All that is essential is that the control device is able, on the basis of the signals which it receives, to determine the current cooling and/or heating requirements of the first and the second aircraft device to be cooled and/or heated and the load condition of the first and/or the second individual cooling and/or heating system.

On the basis of the signals which it receives, the control device controls the operation of the first and/or the second individual cooling and/or heating system and/or the supply of cooling and/or heating energy generated by the first and/or the second individual cooling and/or heating system to the first and/or the second aircraft device to be cooled and/or heated. The cooling energy generated by the first individual cooling and/or heating system is thus no longer exclusively supplied to the first aircraft device to be cooled and/or heated, but can if required also be supplied, by means of the cooling and/or heating energy supply apparatus under the control of the control device, to the second aircraft device to be cooled and/or heated. Such an operation of the system according to the invention is expedient, for example, when the individual cooling and/or heating system associated with the second aircraft device to be cooled and/or heated is already heavily loaded, whereas the individual cooling and/or heating system associated with the first aircraft device to be cooled and/or heated still has cooling and/or heating capacity. Conversely, it may be expedient, on heavy loading of the first individual cooling and/or heating system associated with the first aircraft device to be cooled and/or heated, also to utilise cooling and/or heating energy, generated by the second individual cooling and/or heating system associated with the second aircraft device to be cooled and/or heated, to supply the first aircraft device to be cooled and/or heated.

The system according to the invention for cooling and/or heating aircraft devices to be cooled and/or heated thus ensures that the rigid association of individual cooling and/or heating systems with individual aircraft devices to be cooled and/or heated is removed. Instead, there is provided an overall system which ensures optimised distribution of cooling energy and/or heating energy streams, generated by the individual cooling and/or heating systems, to the cooling and/or heating energy consumers, i.e. the aircraft devices to be cooled and/or heated. As a result, it is no longer necessary to dimension and design the individual cooling and/or heating systems associated with the individual aircraft devices to be cooled and/or heated such that they can meet the maximum cooling and/or heating requirements of the aircraft devices to be cooled and/or heated also at peak-load periods. Rather, it is merely necessary for the overall system to be able to provide the cooling and/or heating energy required by the aircraft devices to be cooled and/or heated during operation. The individual cooling and/or heating systems can thereby be not only of lighter, but also smaller and thus more installation-space-saving design than is the case in systems with a rigid association of individual cooling and/or heating systems with aircraft devices to be cooled and/or heated. Moreover, the system according to the invention enables the implementation of synergies of the individual cooling and/or heating systems which can enable a further weight and volume reduction of the overall system.

The system according to the invention for cooling and/or heating aircraft devices to be cooled and/or heated can comprise merely two individual cooling and/or heating systems. Alternatively to this, however, it is also conceivable to equip the system according to the invention with any desired number of individual cooling and/or heating systems. The cooling and/or heating energy supply apparatus is then preferably adapted to couple at least one, preferably all, aircraft device(s) to be supplied with cooling and/or heating energy by the system according to the invention with the individual cooling and/or heating systems such that the aircraft device(s) can be supplied with cooling and/or heating energy by at least two, preferably all, individual cooling and/or heating systems.

Preferably, the control device of the system according to the invention for cooling and/or heating aircraft devices to be cooled and/or heated is adapted to control the operation of the first and/or the second individual cooling and/or heating system and/or the supply of cooling and/or heating energy generated by the first and/or the second individual cooling and/or heating system to the first and/or the second aircraft device to be cooled and/or heated in such a way that the overall energy requirements of the first and the second individual cooling and/or heating system which are required by the first and/or the second individual cooling and/or heating system to generate the cooling and/or heating energy are minimised. In other words, the control device controls the operation of the individual cooling and/or heating systems and the distribution of the cooling and/or heating energy generated by the individual cooling and/or heating systems in such a way that the energy consumption of the overall system is optimised. For example, the control unit can control the operation of the individual cooling and/or heating systems and the operation of the cooling and/or heating energy supply apparatus in such a way that an individual cooling and/or heating system which is already being operated at high load and consequently with high energy requirements is not operated in an energy-intensive manner at even higher load on increasing cooling and/or heating energy requirements of the aircraft device associated with the individual cooling and/or heating system, but that instead the additional cooling and/or heating energy requirements of the aircraft device are met by an individual cooling and/or heating system which is operable with less load and consequently more energy-efficiently.

The control device can be adapted to control the operation of the first and/or the second individual cooling and/or heating system and/or the supply of cooling and/or heating energy generated by the first and/or the second individual cooling and/or heating system to the first and/or the second aircraft device to be cooled and/or heated while taking account of load-dependent energy requirement data of the first and the second individual cooling and/or heating system. If the control device can continuously access load-dependent energy requirement data of the first and the second individual cooling and/or heating system, the control device can ensure in a particularly simple and convenient manner that the overall energy requirements of the system according to the invention for cooling and/or heating aircraft devices to be cooled and/or heated are minimised.

For example, the control device can be adapted to access load-dependent energy requirement data of the first and/or the second individual cooling and/or heating system stored in a data base. The energy requirement data of the first and the second individual cooling and/or heating system can be stored in the data base, for example, in the form of a lookup table. Additionally or alternatively to this, however, the control device can also be adapted to calculate load-dependent energy requirement data of the first and the second individual cooling and/or heating system using appropriate equations. With such an arrangement, the load-dependent energy requirement data of the first and the second individual cooling and/or heating system are stored not as fixed data, but in parametric form.

The maximum overall cooling and/or heating energy generating capacity of the system according to the invention for cooling and/or heating aircraft devices to be cooled and/or heated is set by the configuration, i.e. the design and dimensioning, of the individual cooling and/or heating systems. The control device of the system according to the invention for cooling and/or heating aircraft devices to be cooled and/or heated can further be adapted, when controlling the operation of the first and/or the second individual cooling and/or heating system and/or the supply of cooling and/or heating energy generated by the first and/or the second individual cooling and/or heating system to the first and/or the second aircraft device to be cooled and/or heated, to give a higher priority to the supply of cooling and/or heating energy to the first or the second aircraft device to be cooled and/or heated over the supply of cooling and/or heating energy to the second or the first aircraft device to be cooled and/or heated if the overall cooling and/or heating requirements of the first and the second aircraft device to be cooled and/or heated exceed the maximum overall cooling and/or heating energy generating capacity of the first and/or the second individual cooling and/or heating system. In other words, if the overall cooling and/or heating requirements of all the aircraft devices to be supplied with cooling and/or heating energy exceeds the overall cooling and/or heating energy generating capacity of the individual cooling and/or heating systems of the overall system, the control device prioritises one or more aircraft device(s) to be cooled and/or heated with regard to the supply of cooling and/or heating energy.

Preferably, the control device is adapted, when prioritising the first or the second aircraft device to be cooled and/or heated over the second or the first aircraft device to be cooled and/or heated with regard to the supply of cooling and/or heating energy, to take account of data characteristic of the relevance of the first and/or the second aircraft device to be cooled and/or heated to the operation of the aircraft. As a result, the control device can give a higher priority, for example, to a safety-relevant aircraft device with regard to the supply of cooling and/or heating energy than to a system which serves merely for the comfort or entertainment of passengers on board the aircraft. Of course, the overall system should, however, still be designed and dimensioned such that all the cooling and/or heating tasks required for proper and safe operation of the aircraft can always be fulfilled, i.e. in all operating situations of the aircraft.

The data characteristic of the relevance of the first and/or the second aircraft device to be cooled and/or heated to the operation of the aircraft are preferably data dependent on the operating state of the aircraft. That is to say, the data take account, for example, of whether the aircraft is on the ground or is flying. Furthermore, the control device is preferably adapted to receive and process signals characteristic of the operating state of the aircraft, and to carry out the prioritising of the first or the second aircraft device to be cooled and/or heated over the second or the first aircraft device to be cooled and/or heated with regard to the supply of cooling and/or heating energy in dependence on the signals characteristic of the operating state of the aircraft.

The control device of the system according to the invention for cooling and/or heating aircraft devices to be cooled and/or heated can serve merely to control the operation of the individual cooling and/or heating systems of the overall system and to control the distribution of the cooling and/or heating energy generated by the individual cooling and/or heating systems to the aircraft devices to be cooled and/or heated. Additionally, however, the control device can also be adapted to influence the operation of the aircraft devices to be cooled and/or heated. For example, the control device can be adapted, in operating situations of the overall system in which the cooling and/or heating energy generated by the overall system is not sufficient to supply sufficient cooling and/or heating energy to all the aircraft devices to be cooled and/or heated, to reduce the power and thus the cooling and/or heating energy requirements of individual aircraft devices which are less relevant, preferably in these operating situations. The control device can be adapted directly to intervene in the operation of the aircraft devices to be cooled and/or heated. Alternatively to this, however, it is also conceivable for the control device to send appropriate signals to further control devices for controlling the operation of the aircraft devices to be cooled and/or heated.

The control device of the system according to the invention for cooling and/or heating aircraft devices to be cooled and/or heated can be adapted to control the operation of the individual cooling and/or heating systems of the overall system and/or the operation of the aircraft devices to be cooled and/or heated digitally, i.e. to switch individual cooling and/or heating systems and/or aircraft devices to be cooled and/or heated on or off according to requirements. Alternatively or additionally to this, however, the control device can also be adapted to control the operation of the individual cooling and/or heating systems of the overall system and/or the operation of the aircraft devices to be cooled and/or heated in such a way that stepwise or continuous adaptation of the power of the individual cooling and/or heating systems and/or the aircraft devices to be cooled and/or heated takes place.

In the case of a method according to the invention for cooling and/or heating aircraft devices to be cooled and/or heated, a first individual cooling and/or heating system associated with a first aircraft device to be cooled and/or heated is provided. Furthermore, a second individual cooling and/or heating system associated with a second aircraft device to be cooled and/or heated is provided. Finally, a cooling and/or heating energy supply apparatus which is adapted to supply cooling and/or heating energy generated by the first and/or the second individual cooling and/or heating system to the first and/or the second aircraft device to be cooled and/or heated is provided. A control device is supplied with signals which are characteristic of the cooling and/or heating requirements of the first and/or the second aircraft device to be cooled and/or heated and of the load condition of the first and/or the second individual cooling and/or heating system. The operation of the first and/or the second individual cooling and/or heating system and/or the supply of cooling and/or heating energy generated by the first and/or the second individual cooling and/or heating system to the first and/or the second aircraft device to be cooled and/or heated is controlled by means of the control device on the basis of said signals.

Preferably, the operation of the first and/or the second individual cooling and/or heating system and/or the supply of cooling and/or heating energy generated by the first and/or the second individual cooling and/or heating system to the first and/or the second aircraft device to be cooled and/or heated is controlled in such a way that the overall energy requirements of the first and the second individual cooling and/or heating system which are required by the first and/or the second individual cooling and/or heating system to generate the cooling and/or heating energy are minimised.

The operation of the first and/or the second individual cooling and/or heating system and/or the supply of cooling and/or heating energy generated by the first and/or the second individual cooling and/or heating system to the first and/or the second aircraft device to be cooled and/or heated can be controlled while taking account of load-dependent energy requirement data of the first and the second individual cooling and/or heating system.

The control device can access load-dependent energy requirement data of the first and the second individual cooling and/or heating system stored in a data base. Additionally or alternatively to this, the control device can calculate load-dependent energy requirement data of the first and the second individual cooling and/or heating system using appropriate equations.

When controlling the operation of the first and/or the second individual cooling and/or heating system and/or the supply of cooling and/or heating energy generated by the first and/or the second individual cooling and/or heating system to the first and/or the second aircraft device to be cooled and/or heated, a higher priority can be given to the supply of cooling and/or heating energy to the first or the second aircraft device to be cooled and/or heated over the supply of cooling and/or heating energy to the second or the first aircraft device to be cooled and/or heated if the overall cooling and/or heating requirements of the first and the second aircraft device to be cooled and/or heated exceed the maximum overall cooling and/or heating energy generating capacity of the first and the second individual cooling and/or heating system.

When prioritising the first or the second aircraft device to be cooled and/or heated over the second or the first aircraft device to be cooled and/or heated with regard to the supply of cooling and/or heating energy, the control device can take account of data characteristic of the relevance of the first and/or the second aircraft device to be cooled and/or heated to the operation of the aircraft.

The data characteristic of the relevance of the first and/or the second aircraft device to be cooled and/or heated to the operation of the aircraft can be data dependent on the operating state of the aircraft. The control device can receive and process signals characteristic of the operating state of the aircraft, and carry out the prioritising of the first or the second aircraft device to be cooled and/or heated over the second or the first aircraft device to be cooled and/or heated with regard to the supply of cooling and/or heating energy in dependence on the signals characteristic of the operating state of the aircraft.

BRIEF DESCRIPTION OF THE DRAWINGS

A preferred embodiment of the invention will now be explained in more detail with reference to the appended schematic FIG. 1 which shows the setup of a system according to the invention for cooling and/or heating aircraft devices to be cooled and/or heated.

DETAILED DESCRIPTION

A system, generally denoted by 10 in the figure, serves to supply a series of aircraft devices 12, 14, 16, 18 present on board an aircraft with cooling and/or heating energy, according to requirements. In the embodiment shown, the aircraft devices 12, 14 are configured such that they have to be supplied with cooling energy in all operating situations in order to ensure proper operation of the aircraft devices 12, 14. The aircraft device 16, by contrast, is an aircraft device which has to be supplied with heating energy during operation. The aircraft device 18, by contrast, has to be alternatively either cooled or heated in dependence on its operating state and the operating state of the aircraft.

In the embodiment shown in the figure, the system 10 serves to supply four aircraft devices 12, 14, 16, 18 with cooling and/or heating energy. However, the system 10 can of course also be designed to supply fewer than four or more than four aircraft devices with cooling and/or heating energy. Moreover, the configuration of the aircraft devices can vary depending on whether the aircraft devices are to be supplied only with cooling energy, only with heating energy or, according to the operating state, with cooling and heating energy.

Associated with the individual aircraft devices 12, 14, 16, 18 are respectively corresponding individual cooling and/or heating systems 20, 22, 24, 26. The individual cooling and/or heating systems 20, 22, 24, 26 are in each case dimensioned and designed such that they serve primarily to supply cooling and/or heating energy to the aircraft devices 12, 14, 16, 18 associated with them. However, a cooling and/or heating energy supply apparatus 28 comprising an appropriately configured conduit system is designed to supply cooling and/or heating energy generated by the individual cooling and/or heating systems 20, 22, 24, 26 to all the aircraft devices 12, 14, 16, 18. In other words, with the aid of the cooling and/or heating energy supply apparatus 28, any aircraft device 12, 14, 16, 18 can be supplied with cooling and/or heating energy by any individual cooling and/or heating system 20, 22, 24, 26. The cooling and/or heating energy streams through the conduit system of the cooling and/or heating energy supply apparatus 28 can be controlled, for example, with the aid of appropriate valves arranged in the conduit system.

Furthermore, the system 10 comprises a control device 30. The control device 30 is embodied in the form of an electronic control device and is adapted to receive and process signals characteristic of the cooling and/or heating requirements of the aircraft devices 12, 14, 16, 18. In other words, the control device 30 receives, from appropriate sensors which are associated with the individual aircraft devices 12, 14, 16, 18 and which can be embodied, for example, in the form of temperature sensors or sensors detecting the current power level of the aircraft devices 12, 14, 16, 18, signals from which the control device 30 can derive the current cooling and/or heating requirements of the aircraft devices 12, 14, 16, 18. Furthermore, the control device 30 receives signals which deliver information about the load condition of the individual cooling and/or heating systems 20, 22, 24, 26 to the control device 30. Said signals are provided by sensors associated with the individual cooling and/or heating systems 20, 22, 24, 26.

On the basis of the signals supplied to it by the sensors associated with the individual cooling and/or heating systems 20, 22, 24, 26 and characteristic of the load condition of the individual cooling and/or heating systems 20, 22, 24, 26, the control device determines appropriate load-dependent energy requirement data of the individual cooling and/or heating systems 20, 22, 24, 26. The load-dependent energy requirement data can either be stored in a data base or be calculated by the control device 30 using appropriate equations. As a result, the control device 30, when controlling the operation of the individual cooling and/or heating systems 20, 22, 24, 26 and/or the supply of the cooling and/or heating energy generated by the individual cooling and/or heating systems 20, 22, 24, 26 to the aircraft devices 12, 14, 16, 18, can take account of the load-dependent energy requirement data of the individual cooling and/or heating systems 20, 22, 24, 26.

This enables the control device 30 to control the supply of the cooling and/or heating energy generated by the individual cooling and/or heating systems 20, 22, 24, 26 and or the operation of the individual cooling and/or heating systems 20, 22, 24, 26 in such a way that the overall energy requirements of the individual cooling and/or heating systems 20, 22, 24, 26 which are required by the individual cooling and/or heating systems 20, 22, 24, 26 to generate the cooling and/or heating energy are minimised. For example, the control device 30 can ensure that, in a case where the aircraft device 14 requires additional cooling energy, but the individual cooling system 22 associated with the aircraft device 14 is already being operated at high load, the cooling requirements of the aircraft device 14 are met by the individual cooling system 20 which is actually associated with the aircraft device 12 but is less loaded, if this enables minimisation of the overall energy requirements of the individual cooling systems 20, 22.

In principle, during operation of the system 10, the case may also arise where the overall cooling and/or heating requirements of the aircraft devices 12, 14, 16, 18 exceed the maximum overall cooling and/or heating energy generating capacity of the individual cooling and/or heating systems 20, 22, 24, 26. In such a case, the control device 30 receives from appropriate sensors 32 signals characteristic of the operating state of the aircraft. For example, on the basis of the signals supplied to it by the sensors 32, the control device 30 can ascertain whether the aircraft is on the ground or is flying.

In dependence on the operating state of the aircraft, the control device 30 prioritises the aircraft devices 12, 14, 16, 18 with regard to their relevance to the operation of the aircraft. For example, safety-relevant aircraft devices enjoy highest priority, whereas the control device 30 gives merely a lower priority to aircraft devices which serve merely for the comfort of people on board the aircraft. The control device 30 then controls the operation of the individual cooling and/or heating systems 20, 22, 24, 26, and the distribution of the cooling and/or heating energy generated by the individual cooling and/or heating systems 20, 22, 24, 26 to the aircraft devices 12, 14, 16, 18, in such a way that firstly the aircraft devices which are given the highest priority by the control device 30 in a particular operating state of the aircraft are supplied with cooling and/or heating energy. In such a situation, the individual cooling and/or heating systems 20, 22, 24, 26 are preferably operated at full load.

If desired or required, the control device 30 can also influence the operation of the aircraft devices 12, 14, 16, 18. If, on the basis of the data available to it, the control device 30 ascertains that the maximum overall cooling and/or heating energy generating capacity of the individual cooling and/or heating systems 20, 22, 24, 26 is not sufficient to supply all the aircraft devices 12, 14, 16, 18 with sufficient cooling and/or heating energy, the control device 30 can reduce the load condition and thus the cooling and/or heating energy requirements of individual aircraft devices preferably classed as less relevant. For this purpose, the control device 30 can have a directly controlling influence on the operation of the aircraft devices 12, 14, 16, 18. Alternatively to this, however, it is also conceivable for the to control device 30 to supply appropriate control signals to control devices associated with the individual aircraft devices 12, 14, 16, 18.

The control device 30 can be adapted to control the operation of the individual cooling and/or heating systems 20, 22, 24, 26 and/or the operation of the aircraft devices 12, 14, 16, 18 to be cooled and/or heated digitally, i.e. to switch individual cooling and/or heating systems 20, 22, 24, 26 and/or aircraft devices 12, 14, 16, 18 to be cooled and/or heated on or off according to requirements. Alternatively or additionally to this, however, the control device 30 can also be designed to control the operation of the individual cooling and/or heating systems 20, 22, 24, 26 and/or the operation of the aircraft devices 12, 14, 16, 18 to be cooled and/or heated in such a way that stepwise or continuous adaptation of the power of the individual cooling and/or heating systems 20, 22, 24, 26 and/or the aircraft devices 12, 14, 16, 18 to be cooled and/or heated takes place.

The invention claimed is:

1. A system for cooling and/or heating aircraft devices to be cooled and/or heated, comprising:
   a first individual cooling and/or heating system associated with a first aircraft device to be cooled and/or heated;
   a second individual cooling and/or heating system associated with a second aircraft device to be cooled and/or heated;
   a cooling and/or heating energy supply apparatus which is adapted to supply cooling and/or heating energy generated by the first and/or the second individual cooling and/or heating system to the first and/or the second aircraft device to be cooled and/or heated; and
   a control device which is adapted to receive and process signals characteristic of cooling and/or heating requirements of the first and/or the second aircraft device to be cooled and/or heated and of a load condition of the first and/or the second individual cooling and/or heating system, and which is further adapted to control, on the basis of said signals, an operation of the first and/or the second individual cooling and/or heating system and/or the supply of cooling and/or heating energy generated by the first and/or the second individual cooling and/or heating system to the first and/or the second aircraft device to be cooled and/or heated.

2. The system according to claim 1, wherein the control device is adapted to control the operation of the first and/or the second individual cooling and/or heating system and/or the supply of cooling and/or heating energy generated by the first and/or the second individual cooling and/or heating system to the first and/or the second aircraft device to be cooled and/or heated in such a way that the overall energy requirements of the first and the second individual cooling and/or heating system which are required by the first and/or the second individual cooling and/or heating system to generate the cooling and/or heating energy are minimized.

3. The system according to claim 1, wherein the control device is adapted to control the operation of the first and/or the second individual cooling and/or heating system and/or the supply of cooling and/or heating energy generated by the first and/or the second individual cooling and/or heating system to the first and/or the second aircraft device to be cooled and/or heated while taking account of load-dependent energy requirement data of the first and the second individual cooling and/or heating system.

4. The system according to claim 3, wherein the control device is adapted to access the load-dependent energy requirement data of the first and the second individual cooling and/or heating system stored in a data base and/or to calculate the load-dependent energy requirement data of the first and the second individual cooling and/or heating system using appropriate equations.

5. The system according to claim 1, wherein the control device is adapted, when controlling the operation of the first and/or the second individual cooling and/or heating system and/or the supply of cooling and/or heating energy generated by the first and/or the second individual cooling and/or heating system to the first and/or the second aircraft device to be cooled and/or heated, to give a higher priority to the supply of cooling and/or heating energy to the first or the second aircraft device to be cooled and/or heated over the supply of cooling and/or heating energy to the second or the first aircraft device to be cooled and/or heated if the overall cooling and/or heating requirements of the first and/or the second aircraft device to be cooled and/or heated exceed the maximum overall cooling and/or heating energy generating capacity of the first and the second individual cooling and/or heating system.

6. The system according to claim 5, wherein the control device is adapted, when prioritizing the first or the second aircraft device to be cooled and/or heated over the second or the first aircraft device to be cooled and/or heated with regard to the supply of cooling and/or heating energy, to take account of data characteristic of the relevance of the first and/or the second aircraft device to be cooled and/or heated to the operation of the aircraft.

7. The system according to claim 6, wherein the data characteristic of the relevance of the first and/or the second aircraft device to be cooled and/or heated to the operation of the aircraft are data dependent on the operating state of the aircraft and in that the control device is adapted to receive and process signals characteristic of the operating state of the aircraft, and to carry out the prioritizing of the first or the second aircraft device to be cooled and/or heated over the second or the first aircraft device to be cooled and/or heated with regard to the supply of cooling and/or heating energy in dependence on the signals characteristic of the operating state of the aircraft.

8. A method for cooling and/or heating aircraft devices to be cooled and/or heated, comprising:
    providing a first individual cooling and/or heating system associated with a first aircraft device to be cooled and/or heated;
    providing a second individual cooling and/or heating system associated with a second aircraft device to be cooled and/or heated;
    providing a cooling and/or heating energy supply apparatus which is adapted to supply cooling and/or heating energy generated by the first and/or the second individual cooling and/or heating system to the first and/or the second aircraft device to be cooled and/or heated;
    supplying signals which are characteristic of cooling and/or heating requirements of the first and/or the second aircraft device to be cooled and/or heated and of a load condition of the first and/or the second individual cooling and/or heating system to a control device; and
    controlling an operation of the first and/or the second individual cooling and/or heating system and/or the supply of cooling and/or heating energy generated by the first and/or the second individual cooling and/or heating system to the first and/or the second aircraft device to be cooled and/or heated by means of the control device on the basis of said signals.

9. The method according to claim 8, wherein the operation of the first and/or the second individual cooling and/or heating system and/or the supply of cooling and/or heating energy generated by the first and/or the second individual cooling and/or heating system to the first and/or the second aircraft device to be cooled and/or heated is controlled in such a way that the overall energy requirements of the first and the second individual cooling and/or heating system which are required by the first and/or the second individual cooling and/or heating system to generate the cooling and/or heating energy are minimized.

10. The method according to claim 8, wherein the operation of the first and/or the second individual cooling and/or heating system and/or the supply of cooling and/or heating energy generated by the first and/or the second individual cooling and/or heating system to the first and/or the second aircraft device to be cooled and/or heated is controlled while taking account of load-dependent energy requirement data of the first and the second individual cooling and/or heating system.

11. The method according to claim 10, wherein the control device accesses the load-dependent energy requirement data of the first and the second individual cooling and/or heating system stored in a data base and/or calculates the load-dependent energy requirement data of the first and the second individual cooling and/or heating system using appropriate equations.

12. The method according to claim 8, wherein, when controlling the operation of the first and/or the second individual cooling and/or heating system and/or the supply of cooling and/or heating energy generated by the first and/or the second individual cooling and/or heating system to the first and/or the second aircraft device to be cooled and/or heated, a higher priority is given to the supply of cooling and/or heating energy to the first or the second aircraft device to be cooled and/or heated over the supply of cooling and/or heating energy to the second or the first aircraft device to be cooled and/or heated if the overall cooling and/or heating requirements of the first and the second aircraft device to be cooled and/or heated exceed the maximum overall cooling and/or heating energy generating capacity of the first and the second individual cooling and/or heating system.

13. The method according to claim 12, wherein the control device, when prioritizing the first or the second aircraft device to be cooled and/or heated over the second or the first aircraft device to be cooled and/or heated with regard to the supply of cooling and/or heating energy, takes account of data characteristic of the relevance of the first and/or the second aircraft device to be cooled and/or heated to the operation of the aircraft.

14. The method according to claim 13, wherein the data characteristic of the relevance of the first and/or the second aircraft device to be cooled and/or heated to the operation of the aircraft are data dependent on the operating state of the aircraft and in that the control device receives and processes signals characteristic of the operating state of the aircraft, and carries out the prioritizing of the first or the second aircraft device to be cooled and/or heated over the second or the first aircraft device to be cooled and/or heated with regard to the supply of cooling and/or heating energy in dependence on the signals characteristic of the operating state of the aircraft.

* * * * *